Jan. 8, 1952     H. L. MUELLER     2,582,057

ROLLER CHAIN

Filed Jan. 2, 1948

INVENTOR.
HOMER L. MUELLER
BY
Oberlin + Limbach
ATTORNEYS.

Patented Jan. 8, 1952

2,582,057

UNITED STATES PATENT OFFICE 2,582,057

ROLLER CHAIN

Homer L. Mueller, Cleveland, Ohio, assignor to The Cleveland Welding Company, Cleveland, Ohio, a corporation of Ohio Application January 2, 1948, Serial No. 92

4 Claims. (Cl. 74—245)

This invention relates as indicated to roller chains and more particularly to flexible roller chains designed to positively engage toothed gear wheels mounted on different shafts whereby power may be transmitted from one to the other.

Roller chains in use today have a number of material shortcomings which have heretofore never been successfully overcome. The roller chains of today are composed of a great number of individual rigid link sections connected to one another through cotter pins or the like. Such a chain is very heavy and quite an expensive and complex mechanism to manufacture. Another shortcoming is the tendency of the chain to break due to the shearing of the pins connecting the links together caused by various unequal stresses at high speed. The present day chains also have a tendency to curl and become entangled when not in use. Still another disadvantage is the necessity to continually oil the various links to lessen the noise created by the conventional chains when running at relatively high speed. These drawbacks are removed by my invention which is composed of two single flat metal strips linked to one another by a plurality of spaced, roller-bearing cross-links.

Therefore it is the primary object of the invention to provide a continuous flexible roller chain of simple and inexpensive structure.

Another object of this invention is to provide such a chain which is extremely light and flexible and yet of great strength under all operating conditions.

Still another object is to provide such a chain readily adaptable for all types of positively driven gears and more particularly for use on bicycles or motorcycle gears.

To the accomplishment of the foregoing and related ends, said invention, then, consists of the means hereinafter fully described and particularly pointed out in the claims.

The annexed drawings and the following description set forth in detail certain mechanisms embodying the invention, such disclosed means constituting, however, but two of various mechanical forms in which the principle of the invention may be used.

Figure 1:
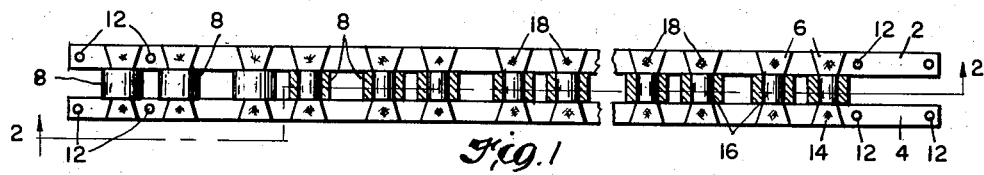
Fig. 1 is a fragmentary top plan view partly in section of my new roller chain.
Figure 2:
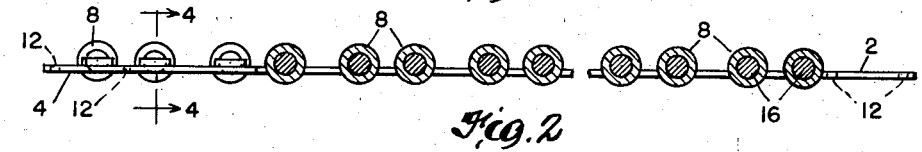
Fig. 2 is a vertical view partly in section of Fig. 1.

Referring now more particularly to the above drawings and especially Figs. 1, 2, 3, and 4, one form of my new roller chain comprises two flat tape-like flexible metal strips 2 and 4 joined to one another in spaced relationship by a plurality of rigid cross-links 6. Mounted on and carried by the cross-links 6 are an equal number of rollers or collars 8 which are so spaced as to cooperate with the gear teeth of a conventional gear wheel (not shown). The metal strips 2 and 4 are cut to lengths such that when the ends of the strips are united, the required roller chain will be provided. The ends of each of the metal strips 2 and 4 are joined to one another by any conventional means such as by rivets 10 through holes 12.

The flexible metal strips 2 and 4 may be of any strong, highly flexible metal such as strip steel. The gage of said strips should be such that the chain constructed therefrom may pass over the gear wheels over which trained without permanent deformation and, of course, the width of said strips should be such that the chain can withstand the maximum tensile loads imposed thereon during normal use. In general said strips are of tape-like form as shown having a width several times the thickness, the thinness of the strips providing the required flexibility and the relatively greater width providing the necessary tensile strength.

The cross-links 6 may be any suitable rigid metal of the necessary strength. Illustrative of such a metal are small pieces of bar stock which have had each end flattened forming a flat wedge-shaped ends 14. This leaves the remaining part of the cross-link substantially cylindrical in shape as shown at 16. The wedge-shaped ends 14 are the portions which are to be secured in spaced relationship to the metal strips 2 and 4. This may be done by any conventional means such as welding, riveting, screws or the like. Illustrative of one method that may be used is the electric spot welding of the wedge-shaped ends 14 to the metal strips 2 and 4 as at 18. When joining the parts in this manner, it is expedient to unite them in overlapping relationship in order to provide sufficient strength and support to the chain. The cross-links 6 are spaced on the metal strips 2 and 4 such that the rollers 8 on the cross-links 6 are in cooperation with the teeth of a conventional gear wheel as in the customary manner. While the foregoing has been illustrative of one form of cross-link adaptable for the present invention, it is in no manner to be construed as a limitation. There are many other materials and methods that may be used to unite the metal strips 2 and 4 and carry the rollers 8.

The rollers 8 may be any type of tubular or cylindrical metal used in conventional roller chains. The necessity of having a freely rotating roller is essential and this makes it desirable to use a cylindrical bar stock as the cross-link. By such a selection, a proper bearing surface is provided by the bar stock, insuring proper strength and free rotation. The rollers 8 are preferably mounted on the cross-links 6 prior to the securing of the cross-links 6 to the metal strips 2 and 4. In the illustrative form given in Figs. 1 to 4, the rollers 8 are mounted on the cylindrical bar stock and the ends of the bar stock are then crushed into the wedge shape 14 insuring an adequate fit and preventing any lateral slippage. The roller-bearing cross-links are then ready for mounting on the two metal strips 2 and 4.

An alternative method for mounting is to use split ring rollers and insert them in place around the bar stock after the cross-links 6 have been united with the metal strips 2 and 4. This is accomplished by spreading the rollers along the split edge and then forcing the rollers over the cross-links 6. The rollers will then snap back into their original shape and will perform as adequately as the first form described.

The embodiment of my invention illustrated in Figs. 6 to 9 is a second form of my invention. In describing such embodiments like parts will be designated by like numerals. In this form, the metal strips 2 and 4 and the cross-links 6 are integrally formed from a single strip of wide flexible metal. In the formation, the wide metal strip is hot rolled to produce the pair of flat metal strips 2 and 4 on either side and a plurality of spaced mill or bulged sections between said strips 2 and 4. The mill sections are so spaced that the roller 8 when mounted thereon will be in cooperation with the gear teeth of the gear wheel. The mill sections are substantially elliptical in shape in their lateral or transverse plane and will serve as the cross-links 6. While the mill section or cross-links 6 have been described as being of a particular design, it is obvious that many other forms of integral cross-links are possible. The reason for the preference for the elliptical-shaped cross-links 6 is that it adds additional strength to the complete chain, particularly when used on a small gear such as found on the rear wheel of a bicycle. Reference hereinafter will be had to the mill section as cross-links 6.

After the formation of the cross-links 6, the wide metal strip is subjected to a stamping operation wherein the unmilled sections between said milled sections is removed. This produces a continuous metal strip composed of metal strips 2 and 4 linked to one another by the plurality of integrally formed cross-links 6. The hereinbefore discussed procedure may be a continuous one producing a very long ladder-like chain. The chains are then cut in the required lengths, the ends of which will be united in the final stage to form the complete roller chain.

Figure 7:
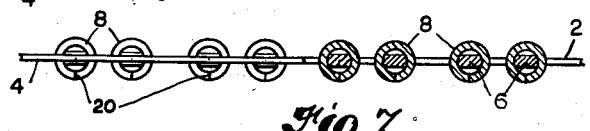
Fig. 7 is a vertical view partly in section of Fig. 6.
Figure 8:
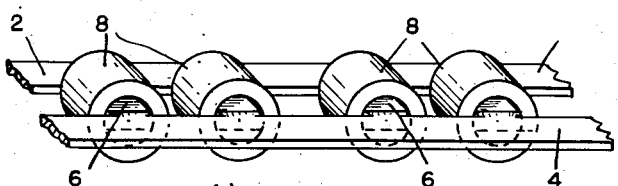
Fig. 8 is a perspective view of the second form of my invention.

In this form of the invention it is essential that the rollers 8 be of the split ring type. They are inserted by forcing the rings 8 open along the split edge 20 and forcing them around the cross-links 6. The spacing of the integrally formed cross-links, as stated hereinbefore, was such that the mounted rollers 8 are in cooperation with the teeth of a conventional gear wheel. The rollers 8 are free-rolling and are slightly shorter in length than the cross-links 6. The cross-links 6 are not perfectly elliptical for their free longitudinal edges are shaped such as to provide a partial bearing surface for the rollers 8 as shown in Fig. 7.

Figures 3, 5:
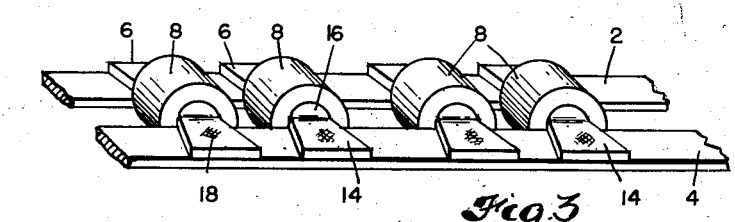
Fig. 3 is a perspective view of a portion of my chain.
Fig. 5 is a vertical view illustrating one form of attaching means for securing the ends of the chain together.
Figure 4:
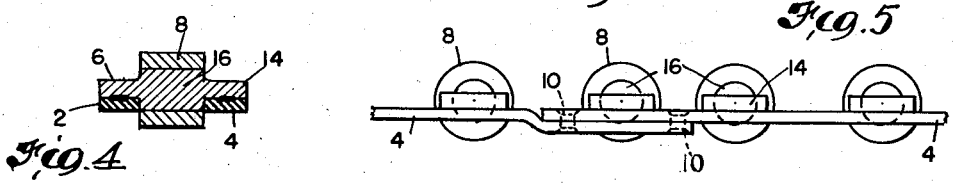
Fig. 4 is a sectional view taken on line 4—4 of Fig. 2.
Figures 6, 9:
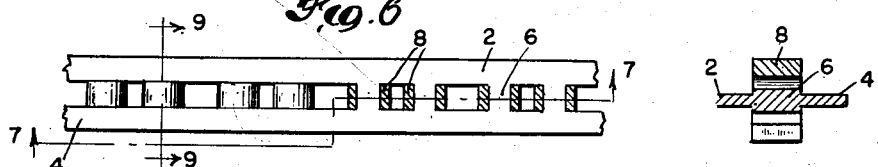
Fig. 6 is a view similar to Fig. 1, but illustrating another form of my roller chain.
Fig. 9 is a sectional view taken on line 9—9 of Fig. 6.

Reference is now to be had to Fig. 5 wherein is shown an illustrative method for uniting the ends of the metal strip 2 and 4 to one another. It is obvious that any form of attaching means can be used to connect the ends to form the complete chain such as riveting or hinging by some form of flexible hinge. For illustrative purposes only, Fig. 5 shows a plurality of holes drilled in metal strips 2 and 4 which are lined up when forming the complete chain. For sake of strength, it is believed necessary to overlap the end 2 and 4 with one another respectively. Brads or rivets 10 are then inserted under force in the holes 12 thus forming a very strong chain.

The roller chain of the present invention is primarily for use as a bicycle or motorcycle chain, but it is obvious that there are many other types of equipment on which it may be used wherein is present a toothed driving gear.

Other modes of applying the principle of the invention may be employed, change being made as regards the details described, provided the features stated in any of the following claims or the equivalent of such be employed.

I therefore particularly point out and distinctly claim as my invention:

1. A flexible roller chain comprising a pair of flexible edgewise adjacent tape-like strips, a plurality of spaced cross-links uniting said strips in parallel spaced relationship, said cross-links being formed with cylindrical bearing portions extending between said strips, and tubular cylindrical rollers journalled on the bearing portions of said cross-links, said strips and cross-links where joined together being thinner than such bearing portions whereby to facilitate flexing of said strips, the opposite ends of said cross-links being flattened to a thickness corresponding generally with the thickness of said strips and secured in overlapped relation on one side of said strips.

2. A flexible roller chain comprising a pair of flexible edgewise adjacent tape-like strips, a plurality of spaced cross-links uniting said strips in parallel spaced relationship, said cross-links being formed with cylindrical bearing portions extending between said strips, and tubular cylindrical rollers journalled on the bearing portions of said cross-links, said strips and cross-links where joined together being thinner than such bearing portions whereby to facilitate flexing of said strips, the opposite ends of said cross-links being flattened to a thickness corresponding generally with the thickness of said strips and to a width exceeding the inside diameter of said rollers whereby to retain each cross-link and roller together as a unit.

3. A flexible roller chain comprising a pair of flexible edgewise adjacent tape-like strips, a plurality of spaced cross-links uniting said strips in parallel spaced relationship, said cross-links being formed with cylindrical bearing portions extending between said strips, and tubular cylindrical rollers journalled on the bearing portions of said cross-links, said cross-links and strips being integrally formed to provide strips of uniform thickness throughout their lengths, said rollers being slit longitudinally for snapping over said cross-links, the bearing portions of said cross-links being of non-circular cross-section shape including coaxial opposite arcuate ends of diameter substantially equal to the inside diameter of said rollers and opposite sides spaced apart a distance less than such inside diameter to facilitate snapping of said rollers over said cross-links.

4. A flexible roller chain comprising a pair of flexible edgewise adjacent tape-like strips, a plurality of spaced cross-links uniting said strips in parallel spaced relationship, said cross-links being formed with cylindrical bearing portions extending between said strips, and tubular cylindrical rollers journalled on the bearing portions of said cross-links, said cross-links and strips being integrally formed to provide strips of uniform thickness throughout their lengths, said rollers being slit longitudinally for snapping over said cross-links, the bearing portions of said cross-links being of non-circular cross-section shape including coaxial opposite arcuate ends of diameter substantially equal to the inside diameter of said rollers and opposite sides spaced apart a distance less than such inside diameter to facilitate snapping of said rollers over said cross-links, such opposite sides being spaced apart a distance exceeding the thickness of said strips whereby to provide substantial bearing portions for journalling said rollers thereon.

HOMER L. MUELLER.

REFERENCES CITED

The following references are of record in the file of this patent:

UNITED STATES PATENTS

| Number | Name | Date |
| --- | --- | --- |
| 199,203 | Hawkins | Jan. 15, 1878 |
| 251,377 | Reese | Dec. 27, 1881 |

FOREIGN PATENTS

| Number | Country | Date |
| --- | --- | --- |
| 307,103 | Great Britain | Mar. 7, 1929 |
| 425,528 | Great Britain | Mar. 15, 1935 |
| 405,845 | France | Nov. 25, 1909 |
| 11,630 | France | Jan. 25, 1910 |
| | (1st Addition to 405,845) | |